(12) United States Patent
Bell

(10) Patent No.: US 11,181,282 B2
(45) Date of Patent: Nov. 23, 2021

(54) FLAT TOP GAS RANGE, A COUNTER CONTAINING, AND A VEHICLE CONTAINING

(71) Applicant: Furrion Property Holding Limited, Hong Kong (HK)

(72) Inventor: Steven N. Bell, Hong Kong (HK)

(73) Assignee: Furrion Property Holding Limited, Hong Kong (HK)

( * ) Notice: Subject to any disclaimer, the term of this patent is extended or adjusted under 35 U.S.C. 154(b) by 193 days.

(21) Appl. No.: 15/985,269

(22) Filed: May 21, 2018

(65) Prior Publication Data

US 2019/0346150 A1 Nov. 14, 2019

(30) Foreign Application Priority Data

May 14, 2018 (HK) .................................. 18106228.1

(51) Int. Cl.
*F24C 15/30* (2006.01)
*F24C 15/12* (2006.01)
*B60N 3/16* (2006.01)

(52) U.S. Cl.
CPC ................ *F24C 15/30* (2013.01); *B60N 3/16* (2013.01); *F24C 15/12* (2013.01)

(58) Field of Classification Search
CPC ................................. F24C 15/30; F24C 15/12
See application file for complete search history.

(56) References Cited

U.S. PATENT DOCUMENTS

| 2,696,812 A | 12/1954 | Merritt, Jr. | |
| 3,059,632 A * | 10/1962 | Rogers | F24C 15/12 |
| | | | 126/37 R |
| 3,392,720 A * | 7/1968 | Sherman | A47B 77/08 |
| | | | 126/211 |

(Continued)

OTHER PUBLICATIONS

Fisheries Supply, Marine Gas Stove with Three Burner Cooktop Range, Sep. 6, 2016 https://web.archive.org/web/20160906075007/https://www.fisheriessupply.com/force-10-marine-gas-stove-with-three-burner-cooktop-range-gimbaled (Year: 2016).*

(Continued)

*Primary Examiner* — Vivek K Shirsat
(74) *Attorney, Agent, or Firm* — Faegre Drinker Biddle & Reath LLP

(57) ABSTRACT

A gas range for a vehicle contains a gas range height. The gas range contains an oven having an oven cavity, and a cooktop located above the oven. The cooktop contains a gas burner having a gas burner height, and a cooking grate above the gas burner. The cooking grate has a cooking grate height. A gas oxidation height is the difference between the cooking grate height and the gas burner height. The gas oxidation height is from about 10 mm to about 40 mm and the gas range height is from about 350 mm to about 450 mm. A gas range also contains an oven, a cooktop and a lid. The oven contains an oven cavity and a plurality of oven exhausts. The cooktop contains a gas burner and a cooking grate above the gas burner. The lid covers the cooking grate and the lid has an open position and a closed position. An oven exhaust leads from the oven cavity to the cooktop and when the lid is closed the lid forms a flat top. A counter may contain the gas oven and a vehicle may contain the gas oven and/or the counter.

14 Claims, 8 Drawing Sheets

(56) References Cited

U.S. PATENT DOCUMENTS

| | | | |
|---|---|---|---|
| 4,004,570 A * | 1/1977 | Keeling, Sr. | F24C 3/12 |
| | | | 126/214 B |
| 4,108,140 A * | 8/1978 | Wolze | F24C 15/36 |
| | | | 126/24 |
| 4,562,827 A | 1/1986 | Cerola | |
| 4,846,671 A * | 7/1989 | Kwiatek | F24C 3/085 |
| | | | 431/266 |
| 5,115,797 A | 5/1992 | Hurner | |
| 5,231,734 A | 8/1993 | Rude | |
| D378,262 S | 3/1997 | Sparks | |
| D393,774 S | 4/1998 | Ashcraft et al. | |
| 5,771,539 A | 6/1998 | Wahlstedt et al. | |
| 5,894,633 A | 4/1999 | Kaneko | |
| 5,931,151 A | 8/1999 | Van Dore et al. | |
| D479,781 S | 9/2003 | Pottenger et al. | |
| D495,557 S | 9/2004 | Shin | |
| 6,867,962 B2 | 3/2005 | Cho et al. | |
| D506,637 S | 6/2005 | Tanaka | |
| D510,226 S | 10/2005 | Vetter | |
| D530,972 S | 10/2006 | Park | |
| D580,225 S | 11/2008 | Geiger et al. | |
| D599,608 S | 9/2009 | Grumm et al. | |
| D605,456 S | 12/2009 | Bengtson et al. | |
| D610,863 S | 3/2010 | Kim et al. | |
| D622,537 S | 8/2010 | Kim et al. | |
| D642,418 S | 8/2011 | Kim et al. | |
| 8,118,020 B2 | 2/2012 | Rummel et al. | |
| D655,128 S | 3/2012 | Kim et al. | |
| D670,969 S | 11/2012 | Bengtson et al. | |
| D682,602 S | 5/2013 | Funnell, II et al. | |
| D685,602 S | 7/2013 | Lee | |
| D700,469 S | 3/2014 | Reay et al. | |
| D702,988 S | 4/2014 | Boo et al. | |
| D731,845 S | 6/2015 | Kim et al. | |
| D736,553 S | 8/2015 | Funnell, II et al. | |
| D763,616 S | 8/2016 | Kim et al. | |
| D765,459 S | 9/2016 | Shoemaker et al. | |
| D773,232 S | 12/2016 | Shoemaker et al. | |
| D781,096 S | 3/2017 | Kim et al. | |
| D781,648 S | 3/2017 | Shoemaker et al. | |
| D786,005 S | 5/2017 | Kim et al. | |
| D786,006 S | 5/2017 | Chung et al. | |
| D787,254 S | 5/2017 | Cho et al. | |
| D787,255 S | 5/2017 | Cho et al. | |
| D787,256 S | 5/2017 | Cho et al. | |
| D789,729 S | 6/2017 | Lee et al. | |
| D793,795 S | 8/2017 | Suh | |
| D808,706 S | 1/2018 | Kim et al. | |
| D808,707 S | 1/2018 | Kim et al. | |
| D811,165 S | 2/2018 | Sadtler | |
| D812,959 S | 3/2018 | Kim et al. | |
| D816,386 S | 5/2018 | Kim et al. | |
| D817,066 S | 5/2018 | Shoemaker et al. | |
| D817,685 S | 5/2018 | Incukur | |
| D839,038 S | 1/2019 | Bell | |
| D851,978 S | 6/2019 | Bell | |
| D851,979 S | 6/2019 | Bell | |
| D851,990 S | 6/2019 | Bell | |
| 10,527,292 B2 | 1/2020 | Bell | |
| D872,516 S | 6/2020 | Bell | |
| 2002/0189604 A1* | 12/2002 | McKenzie | A47J 37/0713 |
| | | | 126/30 |
| 2003/0024525 A1* | 2/2003 | Jennings | F23D 14/045 |
| | | | 126/39 R |
| 2013/0019853 A1 | 1/2013 | Kim et al. | |
| 2015/0260416 A1* | 9/2015 | Chadwick | F24C 15/006 |
| | | | 454/56 |
| 2018/0156468 A1 | 6/2018 | Bell | |

OTHER PUBLICATIONS

"2015 Pinnacle" [online], [retrieved Sep. 8, 2017], Retrieved from the Internet <URL:https://www.google.com/search?safe=active&rls=com.microsoft%3Aen-US%3AIE-Address&biw=913&bih=653&tbm=isch&sa=1&q=rv+stove+glass&oq=rv+stove+glass&gs_l=psy-ab.3 . . . 491717.766060.0.766951.6.6.0.0.0.0.255.805.0j3j1.4.0 . . . 0 . . . 1.1.64.psy-ab..2.2.349 . . . 0j0i67k1j0i8i30k1j0i24k1.n0kolOw_4IY#imgrc=BKnmdP5PQOte2M:&spf=1523295249889>, 1 page.
"2017 Fleetwood Jamboree RV—Class C Motorhome" [online], [retrieved on Sep. 8, 2017], Retrieved from the Internet <URL:http://www.fleetwoodrv.com/2017-fleetwood-jamboree>, 11 pages.
"Atwood RV-2135 BBP 52232 21 Inch," RV Parts Country, rvpartscountry.com, UPC Code: 92931522326, Jan. 6, 2014. https://web.archive.org/web/20140106195901/http://www.rvpartscountry.com/Atwood-3-Burner-21inch-Range-wo-Piezo.html.
"Cameo 43554 Universal Fit RV Stove Top Cover (Black)" [online], [retrieved on Sep. 8, 2017], Retrieved from the Internet <URL: http://www.ebay.com/itm/Camco-43554-Universal-Fit-RV-Stove-Top-Cover-Black-Black-/112357123356?epid=671816644&hash=item1a2901a51c:g:JAUAAOSwDmBY4cQK&vxp=mtr>, 3 pages.
"Conventional Burner Gas Range—Piezo Lite, 17" [online], [first retrieved on Sep. 8, 2017], Retrieved from the Internet <URL:http://www.campingworld.com/shopping/item/conventional-burner-gas-range-piezo-lite-17-/84505&utm_source=google&utm_medium=cpc&scid=scplp84505&sc_intid=84505?utm_campaign=SC Shopping High&affiliateid=6313&gclid=EAIaIQobChMlu-WO-oKW1gIVCi9pChOkjQLZEAQYAyABEgL7mvD_BwE>, 3 pages.
"La Germania 3-Gas Burner Manual Oven," La Germania, cebuappliancecenter.com, Nov. 29, 2014 https://web.archive.org/web/20141129124153/http://www.cebuappliancecenter.com:80/product/la-germania-3-gas-burner-manualoven/lagermania.pdf.
"Marine Gas Stove with Three Burner Cooktop," Fisheries Supply, fisheriessupply.com, Sep. 6, 2016. https://web.archive.org/web/20160906075007/https://www.fisheriessupply.com/force-10-marine-gas-stove-with-three-burner-cooktop-range-gimbaled.
"Stove Top Cover Wooden Counter Mat Travel RV Kitchen Gas Range Burner Serving" [online], [retrieved on Sep. 8, 2017], Retrieved from the Internet <http://www.ebay.com/itm/Stove-Top-Cover-Wooden-Counter-Mat-Travel-RV-Kitchen-Gas-Range-Burner-Serving-/332042293030?epid=1111828905&hash=item4d4f434f26:g:7pYAAOSwiONYNkgb&vxp=mtr>, 3 pages.
"Suburban 3206A Gas Range with Conventional Burners—Black w/Piezo Ignition, 17", Amazon, amazon.com, ASIN:B00PXJRYR0, Manufacturer Part No. 3206A, Nov. 21, 2014. https://www.amazon.com/dp/B00PXJRYR0/.
"Wedgewood RV/Camper Stove" [online], [retrieved Sep. 8, 2017], Retrieved from the Internet <URL: https://www.5miles.com/item/YEZ7JEpQ8KAgK8ze/wedgewood-rvcamper-stove-great-shape>, 3 pages.
Lowe, Jessica. "How to Baby Proof Your RV" [online], [retrieved on Sep. 8, 2017], Retrieved from the Internet <URL:http://www.carefreecommunities.com/blog/how-to-baby-proof-your-rv/>, 4 pages.
Nordby, Klaus."My Latest Experiment in Living on Earth: Klaus "Easy Comfy Rider" Nordby hits the rrrrrrrrrrrrrroad!" [online], [retrieved on Sep. 8, 2017], Retrieved from the Internet <URL:http://klausnordby.com/ego/rv.html>, 11 pages.
Complaint for Damages and Injunctive Relief filed Jul. 24, 2019, *Furrion Property Holding Limited and Furrion Limited* v. *Way Interglobal Network, LLC*, United States District Court for the Northern District of Indiana South Bend Division, Civil Action No. 3:19-cv-00566-PPS-MGG.
Plaintiffs Motion for Preliminary Injunction filed Jul. 25, 2019, *Furrion Property Holding Limited and Furrion Limited* v. *Way Interglobal Network, LLC*, United States District Court for the Northern District of Indiana South Bend Division, Civil Action No. 3:19-cv-00566-PPS-MGG.
Brief in Support of Plaintiff's Motion for Preliminary Injunction filed Jul. 25, 2019, *Furrion Property Holding Limited and Furrion Limited* v. *Way Interglobal Network, LLC*, United States District Court for the Northern District of Indiana South Bend Division, Civil Action No. 3:19-cv-00566-PPS-MGG.
Way Interglobal's Opposition to Plaintiff's Motion for Preliminary Injunction filed Aug. 23, 2019, *Furrion Property Holding Limited and Furrion Limited* v. *Way Interglobal Network, LLC*, United

(56) References Cited

OTHER PUBLICATIONS

States District Court for the Northern District of Indiana South Bend Division, Civil Action No. 3:19-cv-00566-PPS-MGG.
Reply Brief in Support of Plaintiff's Motion for Preliminary Injunction filed Sep. 4, 2019, *Furrion Property Holding Limited and Furrion Limited* v. *Way Interglobal Network, LLC*, United States District Court for the Northern District of Indiana South Bend Division, Civil Action No. 3:19-cv-00566-PPS-MGG.
Answer, Affirmative Defenses, and Counterclaims filed Oct. 17, 2019, *Furrion Property Holding Limited and Furrion Limited* v. *Way Interglobal Network, LLC*, United States District Court for the Northern District of Indiana South Bend Division, Civil Action No. 3:19-cv-00566-PPS-MGG.
Opinion and Order filed Oct. 30, 2019, *Furrion Property Holding Limited and Furrion Limited* v. *Way Interglobal Network, LLC*, United States District Court for the Northern District of Indiana South Bend Division, Civil Action No. 3:19-cv-00566-PPS-MGG.
Answer to Counterclaims filed Nov. 7, 2019, *Furrion Property Holding Limited and Furrion Limited* v. *Way Interglobal Network, LLC*, United States District Court for the Northern District of Indiana South Bend Division, Civil Action No. 3:19-cv-00566-PPS-MGG.
American National Standard For Recreational Vehicle Cooking Gas Appliances, Tenth Edition (ANSI Z21.57-2010) and Addenda (ANSI Z21.57a-2012); Tenth Edition published Jan. 2011, Addenda published Sep. 2012; 161 pages.
Defendant's Final Invalidity Contentions filed Jun. 15, 2021, *Furrion Property Holding Limited and Furrion Limited* v. *Way Interglobal Network, LLC*, United States District Court for the Northern District of Indiana South Bend Division, Civil Action No. 3:19-cv-00566-PPS-MGG.
Airxcel, Inc.—Suburban Division's Objections and Responses to Way Interglobal Network, LLC's May 28, 2021 Subpoena, filed Jun. 23, 2021, *Furrion Property Holding Limited and Furrion Limited* v. *Way Interglobal Network, LLC*, United States District Court for the Northern District of Indiana South Bend Division, Civil Action No. 3:19-cv-00566-PPS-MGG.
Suburban 2985A with 3200A—Flush Mount Glass Cover on Slide-In. Publicly available prior to Nov. 10, 2016. 3 pages.
Suburban 2985A with 3206A—Flush Mount Glass Cover on 17in. Range. Publicly available prior to Nov. 10, 2016. 2 pages.
Suburban 3206A—17in. Convent Burner Black Piezo Range with Deluxe Grate. Publicly available prior to Nov. 10, 2016. 1 page.
Suburban 031302—Deluxe Cooking Grate. Publicly available prior to Nov. 10, 2016. 1 page.
Suburban—Oven Range Deluxe. Publicly available prior to Nov. 10, 2016. 2 pages.
Suburban—Slide-In Deluxe. Publicly available prior to Nov. 10, 2016. 1 page.
Airxcel—Coleman-Mach, Maxxair, Suburban, and Marvair Presentation. Publicly available prior to Nov. 10, 2016. 26 pages.
"Atwood Mobile Products 57732 Wedgewood black 21" Ups Piezo Oven Range 3 Burner (https://www.amazon.com/Atwood-Mobile-Products-52232-Wedgewood/dp/B004LF11WG/ref=pd_sbs_263_4/138-7842717-6725655?_encoding=UTF8&pd_rd_i=B004LF11WG&pd_rd_r=ddea8634-bb11-4f54-b3f1-c04de2d854e6&pd_rd_w=W0ucE&pd_rd_wg=Uiaq8&pf_rd_p=43281256-7633-49c8-b909-7ffd7d8cb21e&pf_rd_r=8B3PHVXY6HXMXF2N6TP7&psc=1&refRID=8B3PHVXY6HXMXF2N6TP7).
CamCo RV Stove Top Cover (https://www.amazon.com/Camco-Universal-Convert-Counter-43554/dp/B000EDSS-MA/ref=sr_1_1?keywords=camco+glass+cover&qid=1566423822&s=gateway&sr=8-1). Available on Jan. 1, 2006, accessed on Sep. 10, 2019.
RV daydream, More RV counter space Cameo 43521 stove top, https://www.youtube.com/watch?v=NVCl2HeulHE (Year 2015).
RVProject, Adding a cover to an Atwood RV-1735 kitchen range in a RV, https://www.youtube.com/watch?v=vCVCe7wRfZc (Year: 2014).

* cited by examiner

FLAT TOP GAS RANGE, A COUNTER CONTAINING, AND A VEHICLE CONTAINING

CROSS-REFERENCE TO RELATED APPLICATIONS

The present application claims the benefit of Hong Kong Application No. 18106228.1, filed May 14, 2018, and is related to U.S. application Ser. No. 29/625,563, filed Nov. 10, 2017; the aforementioned applications are incorporate herein by reference in their entirety.

TECHNICAL FIELD

The present disclosure relates to the field of a gas range, and more particularly a gas range for installing in a counter and/or for use in a vehicle.

BACKGROUND

Vehicles such as, for example, an automobile, an airplane, a watercraft, etc. are becoming more and more sophisticated and luxurious. Larger vehicles, especially luxurious larger vehicles such as yachts, recreational vehicles (RVs), including mobile homes, motor homes, caravans, trailer homes etc., are increasingly expected to contain the comforts one finds in larger, sedentary homes. This increasingly includes comforts such as full ranges having both an oven and a cooktop (i.e., a burner for cooking). See, for example, U.S. Design patent application Ser. No. 29/625,563 to Bell, filed on Nov. 10, 2017 entitled OVEN, and U.S. patent application Ser. No. 15/368,057 to Bell, filed on Dec. 2, 2016, entitled COOKING GAS APPLIANCE, both of which are incorporated by reference herein, in their entireties.

However, as compared to a sedentary home, a vehicle possesses certain limitations with respect to energy, space, etc. While electric burners and electric ovens are possible the electrical energy requirements of an electric oven and/or an electric cooktop may be prohibitive, especially if the vehicle is not connected to the electrical power grid. Typically, the only electricity that is available may come from a 12-volt DC battery system. Therefore, devices for use in vehicles such as a RV should not generally have a high power rating and/or energy consumption. Accordingly, many larger, luxury vehicles employ a gas range utilizing a gas, such as propane gas, butane gas and/or natural gas; or propane gas, for cooking, baking, etc.

Furthermore, very strict regulations exist for the use of gas and other cooking technologies, especially gas cooking, in vehicles. This is because without sufficient room and access for adequate combustion, it is possible that toxic and/or noxious fumes could be generated and cause health or other issues. For example, please see American National Standard Institute's Standard for Recreational Vehicle Cooking Gas Appliances, ANSI Z21.57-2010, and the addenda ANSI Z21.57a-2012. Such standards seek to increase consumer safety by reducing the risk of, for example, carbon monoxide (CO) poisoning due to incomplete combustion of propane and other gases.

Furthermore, as space is often at a premium in a vehicle, for example, a recreational vehicle, a boat, an airplane, etc., often the counter or countertop is needed for multiple tasks such as cleaning, cooking, storage, etc. Therefore, having a large cooktop taking up a large surface area may be considered a waste of space in such a vehicle. Such needs may also exist in, for example, a small apartment or studio.

In addition to taking up needed counter space, the upper surface of a cooktop often juts above the surface of the countertop, thereby making it more difficult to clean, more difficult to easily utilize the existing counter space, etc.

In addition, the space provided for a gas range is often limited and yet users and owners wish to have as large an oven as possible, for example, sized so as to accommodate and bake a large ham and/or turkey for festive occasions.

Accordingly, there exists a need to increase the usable countertop surface area within a vehicle. Furthermore, it is desirable to be able to provide increased counter space while also meeting the relevant carbon monoxide standards.

SUMMARY OF THE INVENTION

An embodiment of the present disclosure relates to a gas range containing a gas range height. The gas range contains an oven having an oven cavity, and a cooktop located above the oven. The cooktop contains a gas burner having a gas burner height, and a cooking grate above the gas burner. The cooking grate has a cooking grate height. A gas oxidation height is the difference between the cooking grate height and the gas burner height. The gas oxidation height is from about 10 mm to about 40 mm; or from about 13 mm to about 35 mm, or from about 15 mm to about 30 mm; or from about 20 mm to about 29 mm. The gas range height is from about 350 mm to about 450 mm; or from about 375 mm to about 425 mm; or from about 390 mm to about 410 mm.

A gas range contains an oven, a cooktop and a lid. The oven contains an oven cavity and a plurality of oven exhausts. The cooktop contains a gas burner and a cooking grate above the gas burner. The lid covers the cooking grate and the lid has an open position and a closed position. An oven exhaust leads from the oven cavity to the cooktop and when the lid is closed the lid forms a flat top.

An embodiment of the present disclosure also relates to a counter containing the gas range as described herein, or a counter containing the gas range described herein installed into the counter.

An embodiment of the present disclosure relates to a vehicle containing the gas range described herein, or the counter described herein.

Without intending to be limited by theory, it is believed that the present disclosure provide a balance between maximizing oven space and yet still providing a flat top gas range. It is believed that by optimizing the height of the gas oxidation height, the gas range herein may provide one or more benefits such as, for example, a maximized oven height, complete combustion and approval according to Z21.57-2010, and the addenda ANSI Z21.57a-2012, a flat top gas range, a gas range which is substantially flush with the countertop, a significantly greater counter space, etc.

BRIEF DESCRIPTION OF THE DRAWINGS

Aspects of the present disclosure will now be described in further detail by way of example with reference to the accompanying drawings, in which.

Figure 1:
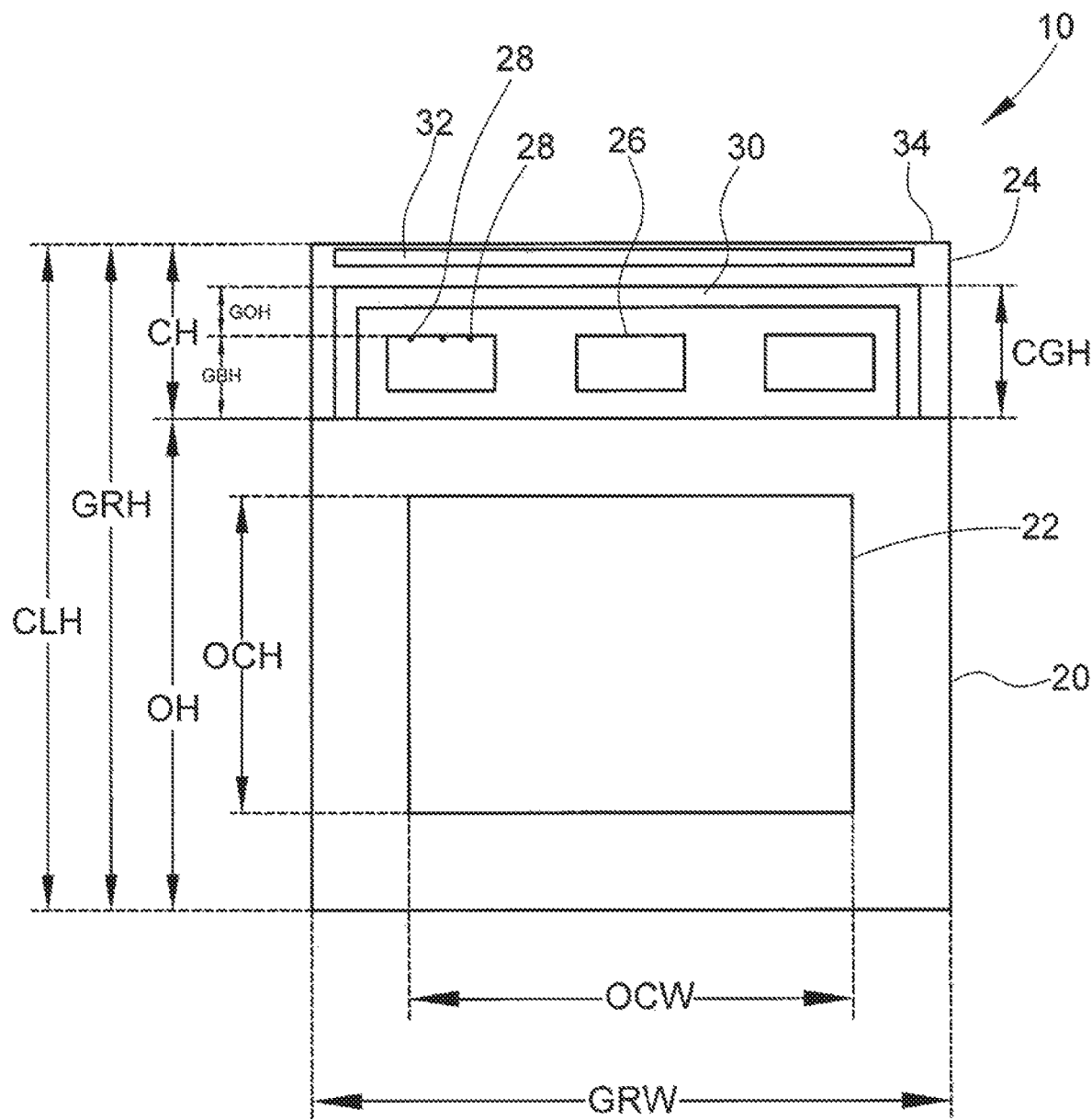
FIG. 1 illustrates a schematic view of an embodiment of a gas range of the present disclosure.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise.

As used herein, the term "flat top" indicates that when the lid herein is in the closed position, the lid, or a surface attached to the lid, forms a flat surface which allows the area to be used for storage, placing a cutting board, chopping, etc. in effect extending the useable surface area as if it was part of the countertop. While the surface formed by the lid need not be perfectly flat (see, for example, the hinges that slightly protrude from the flat top formed by the lid in FIG. 2), the surface should be substantially flat, so as to form a useful surface. Moreover, in an embodiment herein, the flat top is substantially level with the countertop if installed therein.

As used herein, the term "gas range" indicates a combination of an oven and a gas cooktop. The oven may be a gas or electric oven; or a gas oven. The cooktop is a gas cooktop and contains at least one burner for combusting a gas, typically propane gas, to create a fire for cooking. Gas ranges are generally well-known in the art and are present in buildings, such as houses, as well as vehicles such as an automobile, an airplane, a watercraft, etc.; or a recreational vehicle, a boat, a submarine, an airplane, and a combination thereof.

As used herein, the "gas burner height" indicates the height between the base of the cooktop and the top of a gas hole, where the gas exits the burner for combustion.

An embodiment of the present disclosure relates to a gas range for a vehicle, where the gas range contains a gas range height. The gas range contains an oven having an oven cavity, and a cooktop located above the oven. The cooktop contains a gas burner having a gas burner height, and a cooking grate above the gas burner. The cooking grate has a cooking grate height. A gas oxidation height is the difference between the cooking grate height and the gas burner height. The gas oxidation height is from about 10 mm to about 40 mm; or from about 13 mm to about 35 mm, or from about 15 mm to about 30 mm; or from about 20 mm to about 29 mm. The gas range height is from about 350 mm to about 450 mm; or from about 375 mm to about 425 mm; or from about 390 mm to about 410 mm.

Without intending to be limited by theory, it is believed that the gas oxidation height herein represents the minimum height needed in order to provide sufficient combustion so as to pass the ANSI test described herein. It is believed that when a cooking implement such as a pot or a pan is placed on the cooking grate, the distance between the top of the gas hole through which the gas passes and the bottom of the cooking implement must be sufficient so as to allow air to mix with the gas and create sufficient combustion to avoid carbon monoxide formation. Without intending to be limited by theory, it is believed that if the gas oxidation height is too short, then this increases the chance that carbon monoxide will form. While a higher/taller gas oxidation height is possible, it is believed that this results in either a gas range which protrudes above the counter too much or a shorter over cavity height; both of which are undesirable.

An embodiment of the present disclosure also relates to a counter containing the gas range as described herein, or a counter containing the gas range described herein installed into the counter.

An embodiment of the present disclosure relates to a vehicle containing the gas range described herein, or the counter described herein.

Accordingly, it is believed that by optimizing the height of the gas oxidation height, the present disclosure safely provides one or more benefits such as, for example, a maximized oven height, complete combustion and approval according to ANSI Z21.57-2010, and the addenda ANSI Z21.57a-2012, a flat top gas range, a gas range which is substantially flush with the countertop, a significantly greater counter space, etc. It is further believed that the present disclosure successfully balances the competing desires to maximize oven space and yet still provide increased counter space by providing a flat top gas range.

Such a flat top gas range may increase available and usable counter space by providing another surface to prepare food, place/store items, etc. In such a situation, it is preferred that the gas range herein contain a lid for covering the cooking grate. The lid may possess an open position and a closed position. When the lid is in the closed position, the gas range contains a closed lid height. In an embodiment herein, the closed lid height is substantially the same as; or level with, the gas range height; or is from about 0 to about 10 mm higher than the gas range height; or from about 0 to about 5 mm higher than the gas range height; or from about 0 to about 3 mm higher than the gas range height.

In an embodiment herein, the oven cavity contains an oven cavity height. As the oven cavity is typically a square or a rectangle, the oven cavity height is typically quite uniform regardless of where it is measured. However, in case the oven cavity height is not uniform, then as used herein, the oven cavity height is considered to be the longest distance available within the oven cavity, when measured perpendicular to the base of the gas range. As mentioned herein, it is desirable to maximize the height of the oven cavity as it allows a larger cooking volume and also may allow the baking of, for example, a chicken, a roast, a rack of ribs, a turkey, etc. therein. Furthermore, a large oven may be considered a significant indication of luxury. Accordingly, in an embodiment herein, the oven cavity height is from about 150 mm to about 310 mm; or from about 170 mm to about 280 mm; or from about 200 mm to about 260 mm.

In addition, it is believed that when the oven appears larger, then it again reinforces the image of a luxury appliance. Accordingly, in an embodiment herein the oven has an oven height. It an embodiment herein, the percentage of the oven height with respect to the gas range height is from about 25% to about 99%; or from about 45% to about 98%; or from about 60% to about 95%; or from about 65% to about 90%.

Similarly, it is desirable to have as wide of an oven cavity as possible, and therefore in an embodiment herein, the oven cavity has an oven cavity width of from about 500 mm to about 250 mm; or from about 450 mm to about 300 mm; or from about 400 mm to about 350 mm. Similarly, it is desirable to maximize not just the width of the oven cavity, but to also maximize the width of the oven cavity with respect to the gas range. Accordingly, in an embodiment herein, the gas range has a gas range width, and the percentage of the oven cavity width with respect to the gas range width is from about 25% to about 99%; or from about 45% to about 98%; or from about 60% to about 95%; or from about 65% to about 93%.

In an embodiment herein, the oven contains a door to seal the oven cavity. The door may typically have a glass window or other heat-resistant transparent layer to allow the user to see into the oven when it is cooking.

Typically propane gas, butane gas, natural gas, and a combination thereof; or propane gas is used for cooking in a gas range. Such a gas is typically contained in a pressurized bottle, or other storage container. In certain cases, the gas may be stored as a liquid in a pressurized container, and operatively-connected to the gas range. The gas range typically also has an electrical spark which provides an ignition for the gas so that it can be used. In an embodiment herein, the gas range further comprises a gas feed configured to provide a gas for cooking with the gas range, wherein the gas is at least one gas chosen from propane gas, butane gas, natural gas, and a combination thereof.

In an embodiment herein, the cooktop is a gas cooktop, while the oven may be either an electric oven, a gas oven, a microwave oven, and a combination thereof. In an embodiment herein, the cooktop is a gas cooktop and the oven is a gas oven.

As mentioned herein, an embodiment of the present disclosure relates to a counter; or a countertop, having the gas range installed therein. In the case of a vehicle containing the gas range or the counter; or countertop herein, the installation may occur at the factory, at a dealership, or afterwards. In order to maximize counter space and the aesthetics of the counter, in an embodiment herein, the counter has a level surface, and the gas range is installed into or adjacent to the level surface. The gas range (including the lid) may protrude from the level surface (i.e., the gas range rises above the counter) a maximum distance of from about 0 mm to about 20 mm; or from about 0 mm to about 10 mm; or from about 0 mm to about 5 mm. In an embodiment herein, the gas range may lie below the level surface of the counter a maximum distance of from about 0 mm to about 20 mm; or from about 0 mm to about 10 mm; or from about 0 mm to about 5 mm. Without intending to be limited by theory, it is believed that the top of the gas range should be as close as possible to the level surface of the countertop so as to improve the utility of the gas range. In an embodiment herein, the lid; or the flat top, is substantially level with the countertop if installed therein or adjacent thereto.

In an embodiment herein the lid; or the highest portion of the lid is substantially even with the level surface of the counter, meaning that the height variance is from about 0 mm to about 20 mm; or from about 0 mm to about 10 mm; or from about 0 mm to about 5 mm. In an embodiment herein the lid has an open position and a closed position, and may pivot between these positions via, for example, one or more lid hinges. In an embodiment herein, a lid hinge; or a plurality of lid hinges, is/are located in the rear of the lid and/or the cooktop, and a lid hinge; or each hinge, contains a spring. The spring biases the lid hinge so as to allow the lid to be more easily moved into the open position and/or the closed position. In an embodiment herein, the spring and the lid hinge bias the lid into the open position, the closed position, or both the open position and the closed position providing, respectively, a bias selected from the group of an opening bias, a closing bias, and a combination thereof. In an embodiment herein, when the lid reaches a predetermined angle, then because of the bias, the spring and lid hinge automatically move the lid to either the open or closed position. For example, if the opening bias is predetermined for when the lid is opened to about 60°, then when the lid is at an angle of more than 60°, then the lid will more easily flip up into the open position; or flip up into the open position. If, for example, the closing bias is predetermined for when the lid is closed to about 30°, then when the lid is at an angle of less than 30°, then the lid will more easily settle into the closed position; or settle into the closed position. In an embodiment herein, the bias is provided by a locking mechanism.

Without intending to be limited by theory, it is believed that a bias, especially an opening bias, may, for example, reduce the likelihood of accidents caused by the lid moving; or closing, while the gas burner(s) is/are in use, and/or an object is placed on the cooking grate. Such a feature may be especially useful in the case where a gas range is being used in a vehicle while it is moving.

In an embodiment herein, a vehicle contains the gas range or the counter herein. The vehicle may be selected from the group of an automobile, an airplane, a watercraft, and a combination thereof; or a recreational vehicle, a boat, a submarine, an airplane, and a combination thereof. In an embodiment herein, the recreational vehicle is selected from a mobile home, a motor home, a caravan, a trailer home, etc.

In an embodiment herein, the oven contains at least one oven exhaust; a plurality of oven exhausts; or from about 2 oven exhausts to about 10 oven exhausts; or from about 2 oven exhausts to about 5 oven exhausts; or from about 2 oven exhausts to about 3 oven exhausts. In an embodiment herein the oven exhausts lead from the interior of the oven cavity to the cooktop; or the area above the cooktop. The oven may further contain a vent; or a plurality of vents; or the same number of vents as oven exhausts, on the cooktop or positioned adjacent to the cooktop. Without intending to be limited by theory, it is believed that a plurality of oven exhausts allows the oven to possess a more even/uniform temperature therein, as opposed to an oven containing only a single, large exhaust. For example, one who is used to baking understands and has experienced the situation where, even with a convention oven, the front of the oven is oftentimes hotter than the back of the oven, which may primarily be due to a large vent in the back of the oven cavity. It is believed that by having a plurality of (smaller) oven vents, the temperature in the interior of the oven cavity may be more uniform.

In an embodiment herein, the cooktop is removable from the gas range. Without intending to be limited by theory, it is believed that this may, for example, make the installation, cleaning and/or dismantling of the gas range significantly easier. In an embodiment herein, the cooktop may be removable by lifting the rear of the cooktop up and away from the gas oven, while pivoting the front of the cooktop on the front of the oven. In an embodiment herein, the rear of the cooktop contains a locking mechanism; or a friction-lock, which keeps the cooktop locked to the gas oven unless a significant amount of force is applied. Without intending to be limited by theory, it is believed that this prevents the cooktop from dislodging from the gas oven unless it is purposely removed.

Turning to the figures, FIG. 1 shows a schematic view of an embodiment of a gas range, 10, herein having a gas range height, GRH, and an oven cavity, 20. The gas range, 10, contains a cooktop, 24, located above the oven, 20, here a gas oven. The cooktop, 24, contains a gas burner, 26, which defines a gas burner height, GBH. The gas burner height is measured from the base of the cooktop, 24, to the uppermost point of a gas hole in the through which the gas exits the gas burner, 26, for combustion.

A cooking grate, 30, is located above the gas burner, 26, and serves to hold a cooking implement, such as a pot, a pan, etc. The cooking implement in turn holds or contains the items to be cooked. The cooking grate, 30, has a cooking grate height, CGH, which is measured from the base of the cooktop, 24, to the uppermost point of the cooking grate, 30.

A gas oxidation height, GOH, is defined as the difference between the cooking grate height, CGH, and the gas burner height, GBH.

A lid, 32, covers the cooking grate, 30, and forms the top surface, 34, of the gas range, 10 when the lid is closed. Thus in FIG. 1, the gas range, 10, also has a closed lid height, CLH, which in this embodiment is substantially identical to; or the same as, the gas range height, GRH. The cooktop height, CH, is the distance from the base of the cooktop, 24, to the top surface, 34. The gas range height, GRH, is measured from the base of the oven, 20, to the top surface, 34. In an embodiment herein, the lid, 32, may, for example, lie directly on the cooking grate, 30, may be supported above the cooking grate, 30, etc. In an embodiment herein, the lid, 32, is formed of a lid material, for example, glass, a plastic, a metal, a resin, and a combination thereof; or glass; or tempered glass. Furthermore, the lid may be formed of a single solid piece of lid material, or may be multiple pieces of lid material attached by, for example one or more hinges (see FIG. 2 at 36).

In FIG. 1, the oven, 20, also has an oven height, OH, and an oven cavity height, OCH, and in this embodiment the oven height is about 76% of the gas range height. Similarly, the gas range, 10, has a gas range width, GRW, measured from the left side of the gas range, 10, to the right side of the gas range, 10. The oven cavity, 22, also has an oven cavity width, OCW, as measured from left to right, and in this embodiment the oven cavity width is about 70% of the gas range width.

Figure 2:
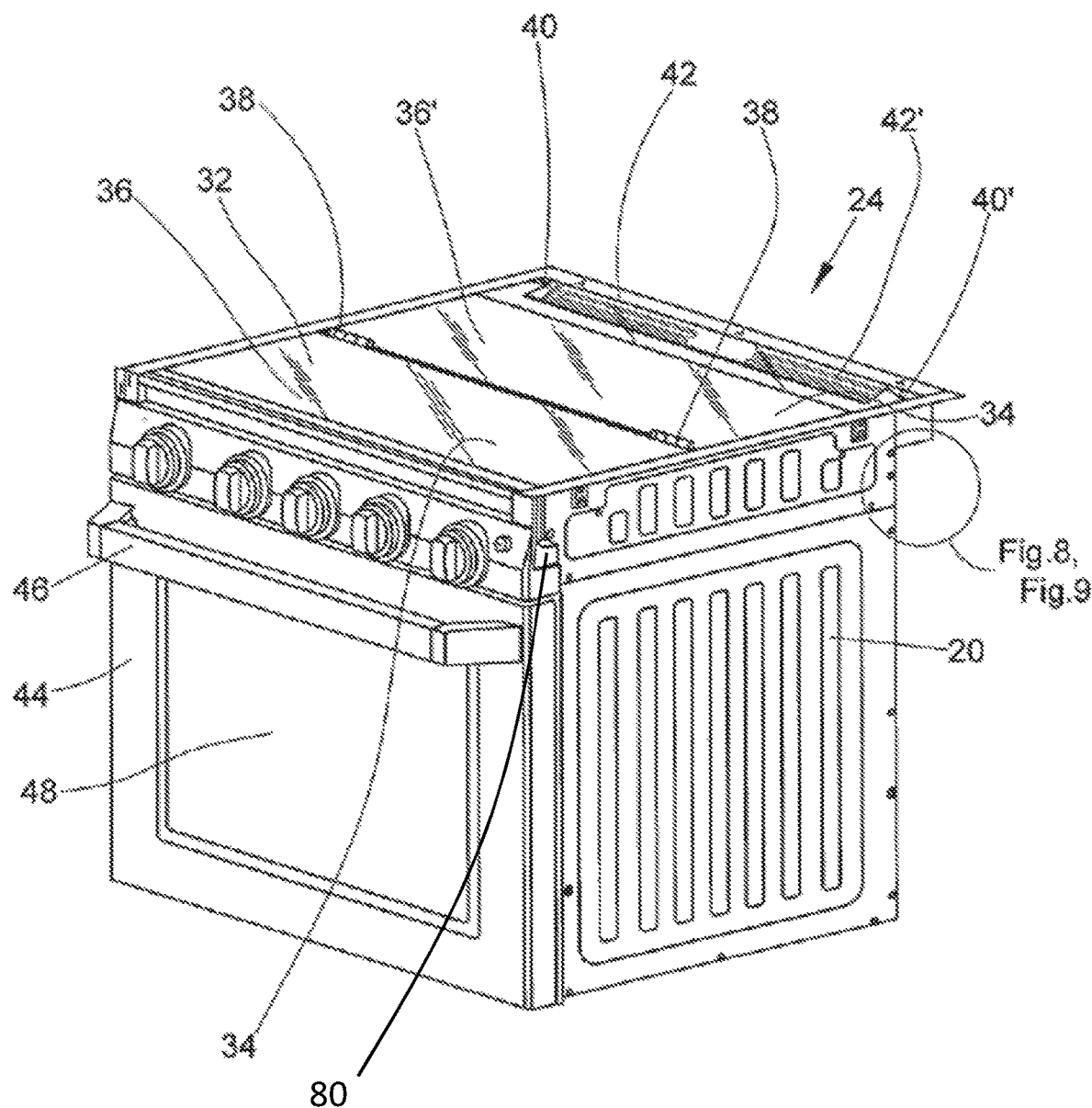
FIG. 2 shows a top perspective view of an embodiment of the gas range of the present disclosure.

FIG. 2 shows a top perspective view of an embodiment of the gas range, 10, herein. In FIG. 2, a glass lid, 32, is in the closed position. The lid, 32, is formed from two pieces of glass herein described as a front glass, 36, and a back glass, 36', connected by a hinge, 38. The lid, 32, further contains a pair of lid hinges, 40 and 40', which allow the entire lid to pivot up into the open position. This in turn allows the cooktop, 24, to be used for cooking. However, when the cooktop, 24 is not needed, the lid, 32, may be pivoted down into the closed position (as seen in FIG. 2), and the cooktop may be used to, for example, prepare food, support a chopping board, etc.

In the embodiment of FIG. 2, the front glass, 36, rotates clockwise towards the back glass, 36', fold over together via the hinges, 38 and 38', such that the top surface, 34, of the front glass, 36 is adjacent to; or touching, the top surface, 34, of the back glass, 36'. Thus, the lid, 32, may be folded in an open position, with the lid hinges, 40 and 40', in the open position with the back glass, 36', positioned vertically. The lid is then in the open position (see FIG. 7) which opens up the entire cooktop for cooking. Alternatively, the hinges, 38, allow the lid, 32, to be in a half-open position, whereby the glass, 36', is horizontally covering the back half of the cooktop, 24, while the front glass, 36, is doubled-over the back glass, 36', so as to open up the front half of the cooktop, 24, for cooking.

FIG. 2 also shows that the gas range contains a vent, 42, here two vents, 42 and 42', which allow hot air to exit from the oven, 20, during use. The lid hinges, 40 and 40', are located at the left and right sides of the cooktop, 24, outside of the vents 42 and 42'.

The oven, 20, also contains an oven door, 44, and an oven handle, 46, attached thereto to allow the user to open the oven door, 44. The oven also contains a transparent window, 48, allowing the user to see what is inside. The gas range unit, 10, can include a corner piece, 80.

Figure 3:
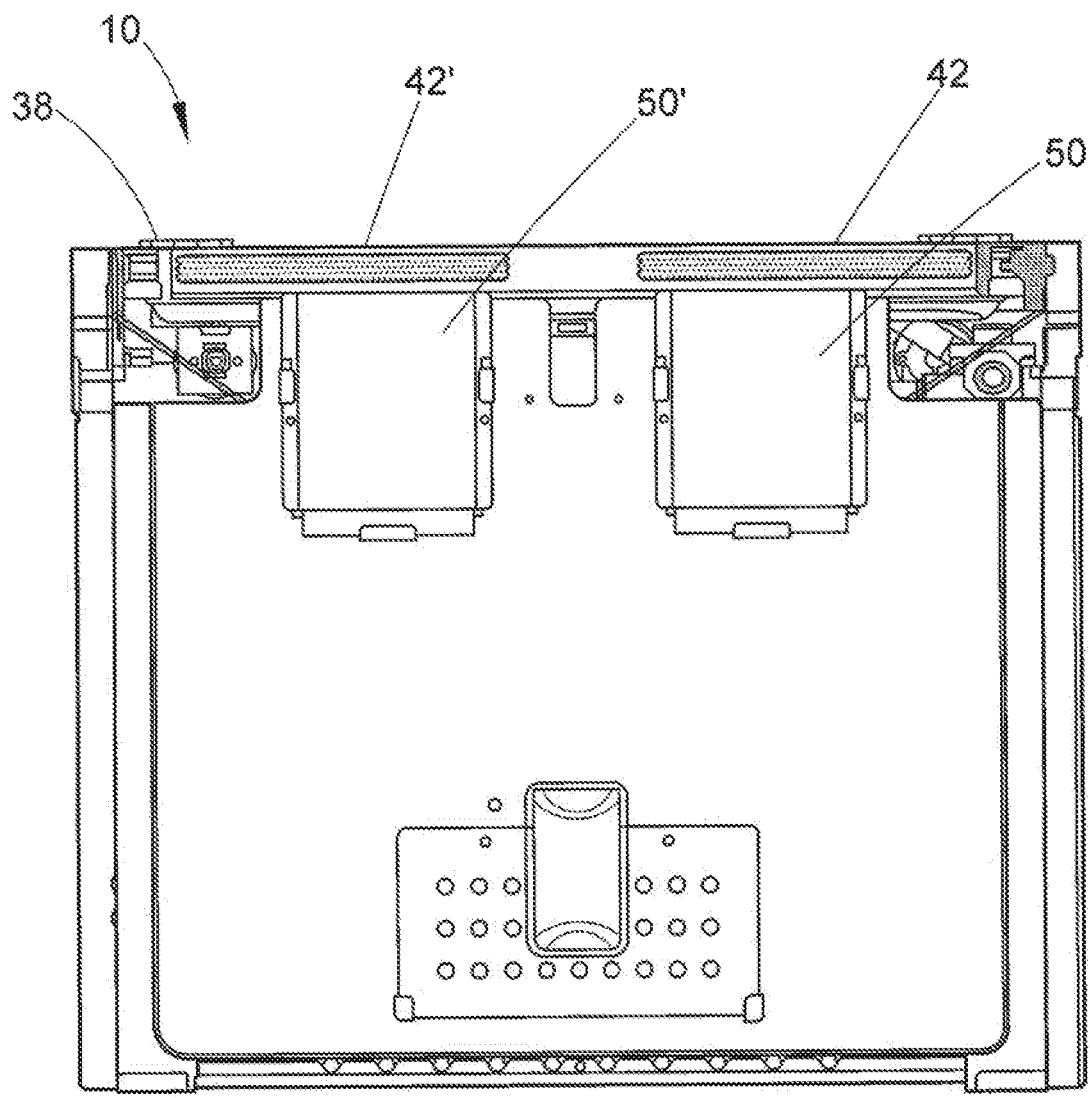
FIG. 3 shows a back view of the gas range according to FIG. 2.

FIG. 3 shows a back view of the gas range according to FIG. 2. In FIG. 3, the vents, 42 and 42', can be seen as well as a pair of oven exhausts, 50 and 50', which lead from the interior of the oven (see FIG. 1 at 20), to the vents, 42 and 42'. In other words, any contents in the oven exhausts, 50 and 50', are in fluid communication with the vents, 42 and 42', to be released into the atmosphere. In the embodiment of FIG. 3, it is believed that the use of the dual oven exhausts, 50 and 50', allows a greater amount of air to be exhausted from the interior of the oven cavity (see FIG. 1 at 22) and through the vents, 42 and 42', into the area above the gas range, 10, so as to meet relevant regulations. Furthermore, it is believed that by employing these dual vents, allows a more even/uniform over temperature in the oven cavity as compared to the use of a single vent.

Figure 4:
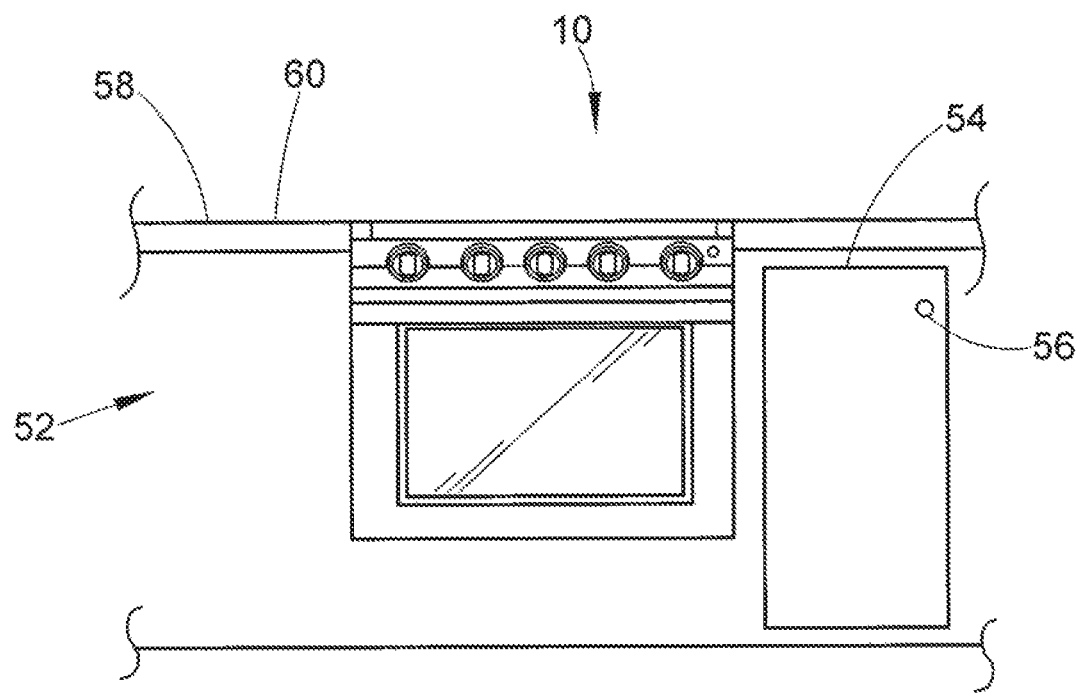
FIG. 4 shows a front view of an embodiment of a counter of the present disclosure.

FIG. 4 shows a front view of an embodiment of a counter, 52, herein, containing the gas range, 10. In this case, the gas range, 10, is built into the counter, 52, and installed, for example, at a recreational vehicle dealership. The counter, 52, contains a cabinet, 54, having a cabinet handle, 56. In FIG. 4, the counter, 52, further contains a countertop, 58, which forms a level surface, 60, and is typically formed of wood, metal, plastic, a resin, and a combination thereof. The counter useful herein may further contain, for example, a shelf, a drawer, a sink, etc. as desired.

Figure 5:
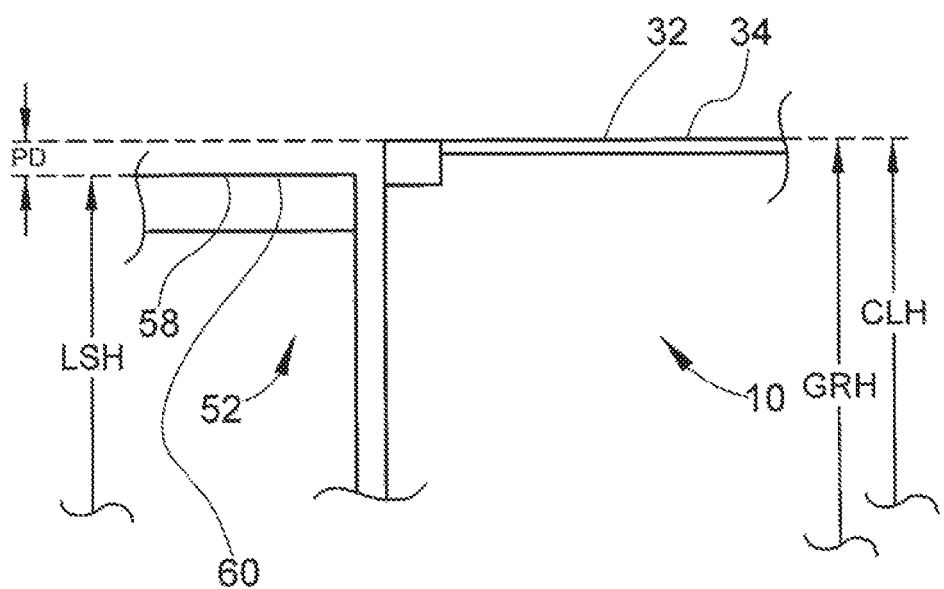
FIG. 5 illustrates a close up of an embodiment of the counter of the present disclosure.

FIG. 5 illustrates a close up of an embodiment of the counter, 52, herein, showing that the level surface, 60, has a level surface height, LSH, which is slightly lower than the gas range height, GRH, and the closed lid height, CLH. The lid, 32, forms a top surface, 34, whose closed lid height, CLH, is slightly higher than the level surface height by a protruding distance, PD. Top surface, 34, is parallel to level surface, 60. In an embodiment herein, the protruding distance, PD, is a maximum distance; or a distance, of from about 0 mm to about 20 mm; or from about 0 mm to about 10 mm; or from about 0 mm to about 5 mm. It is recognized that the closed lid height, CLH, or the gas range height, GRH, may lie below the level surface height, LSH, of the counter a maximum distance, or a distance, of from about 0 mm to about 20 mm; or from about 0 mm to about 10 mm; or from about 0 mm to about 5 mm.

Figure 6:
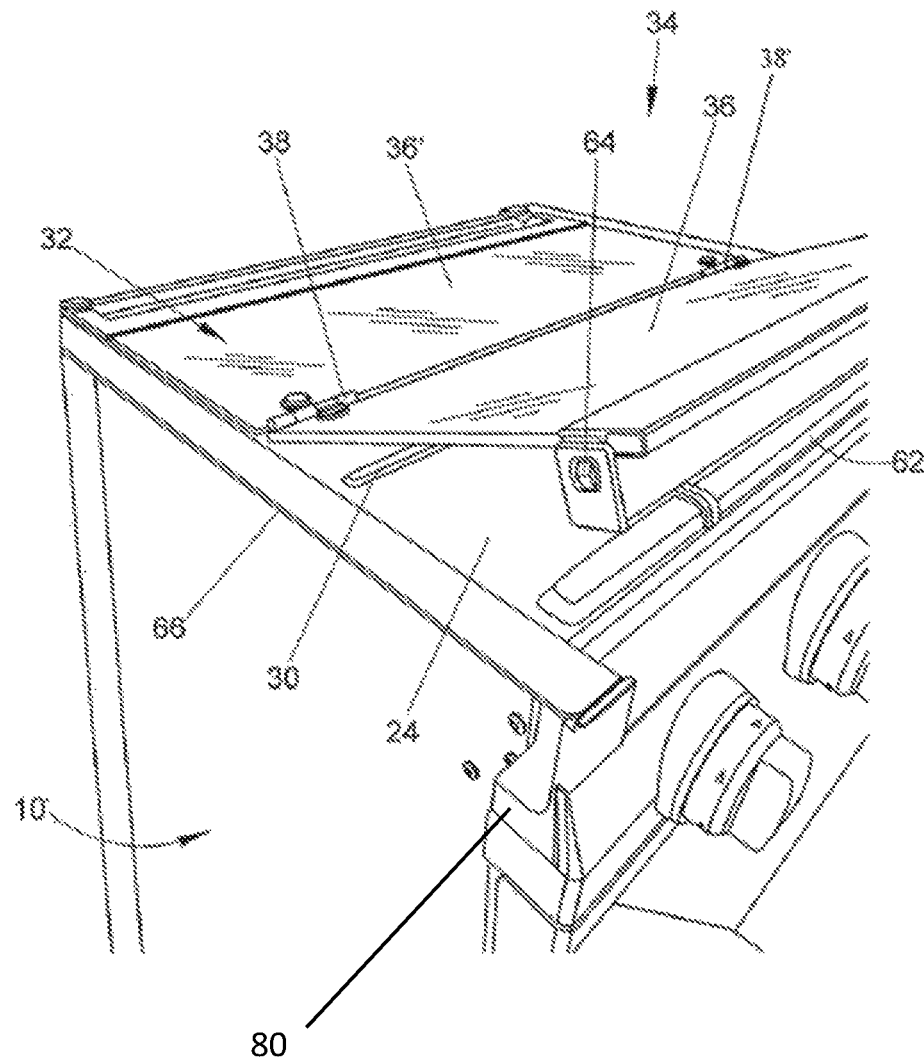
FIG. 6 illustrates a partial top perspective view of an embodiment of a gas range including a lid of the present disclosure.

FIG. 6 shows a close up of an embodiment of a partially-opened lid, 32, herein. The lid, 32, is formed of a front glass, 36, and a back glass, 36', attached via hinges, 38 and 38'. The lid, 32, is on the top of the cooktop, 24, and forms the top surface, 34, thereof.

In this embodiment, the front edge of the lid, 32, and specifically the front edge of the front glass, 36, contains a stopper, 64. When the lid, 32, is in the closed position (see FIG. 2), then the stopper, 64, rests upon the cooktop, 24, and provides additional structural support for the lid, 32, in case, for example, heavy objects, a cutting board, etc. are placed thereupon, etc. Without intending to be limited by theory, it is believed that this can reduce the chance of deformation and/or breakage of the lid, 32.

The cooktop, 24, also contains a cooktop side edge, 66, which can fit onto the countertop (see FIG. 4 at 58); or the level surface (see FIG. 4 at 60), to ensure that the countertop (see FIG. 4 at 58); or the level surface (see FIG. 4 at 60), and the gas range, 10; or the top surface, 34; or the cooktop, 24; or the lid, 32, are aligned so as to be substantially level. Without intending to be limited by theory, it is believed that the cooktop side edge also may overlap and cover any gap between the countertop (see FIG. 4 at 58); or the level surface (see FIG. 4 at 60),and the gas range 10; or the top surface, 34; or the cooktop, 24; or the lid, 32, so as to prevent food or other items from dropping therebetween. This in turn may, for example, reduce loss of items, make cleaning easier, etc. The gas range, 10, can include a corner piece, 80, positioned under the cooktop side edge, 66, and at the front of the gas range, 10, as illustrated in FIG. 6. When the gas range, 10, is installed in counter, the corner piece, 80, is positioned between the counter and the gas range, 10.

Figure 7:
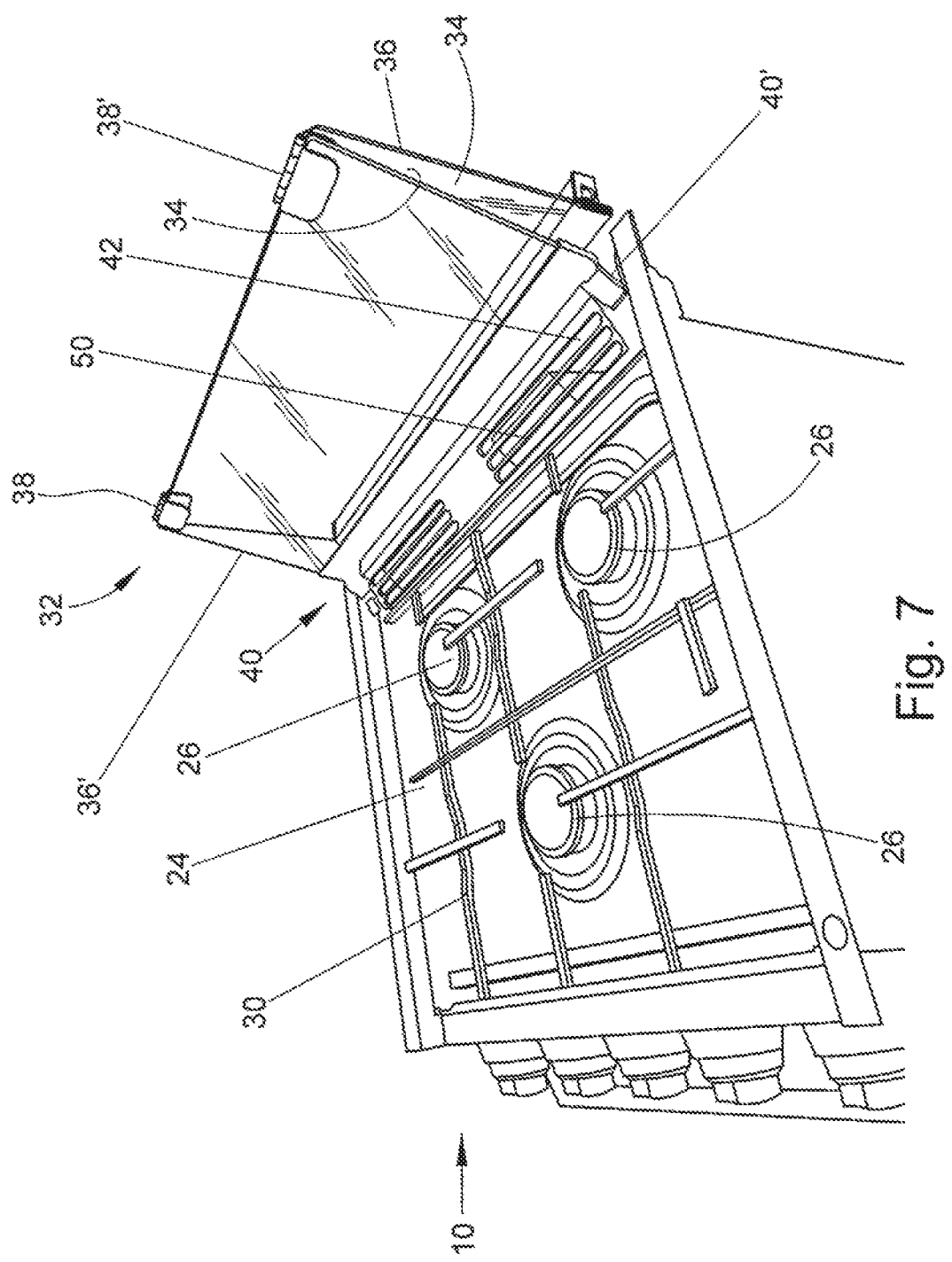
FIG. 7 illustrates a partial top perspective view of another embodiment of a gas range including a lid, the lid in an open position, of the present disclosure.

FIG. 7 shows an embodiment of the gas range, 10, when the lid, 32, is in the open position. In this case, the front glass, 36, is folded via the hinges, 38 and 38', so that the top surfaces, 34, of each of the front glass, 36, and the back glass, 36', are adjacent. The back glass, 36', is further rotated via the lid hinges, 40 and 40', so that the lid is in the (fully) open position. In the open position, the gas burners, 26, of the cooktop, 24, are exposed. The cooking grate, 30, rests above the gas burners, 26. In addition, it can be seen that the lid, 32, folds so that the front glass, 36 and the back glass, 36', are both to the rear of the vent, 42, and the oven, 50, which leads to the vent, 42. Accordingly, the oven exhaust and the vent release hot air from the oven cavity (see FIG. 1 at 22) in front of the folded lid, 32.

Figure 8:
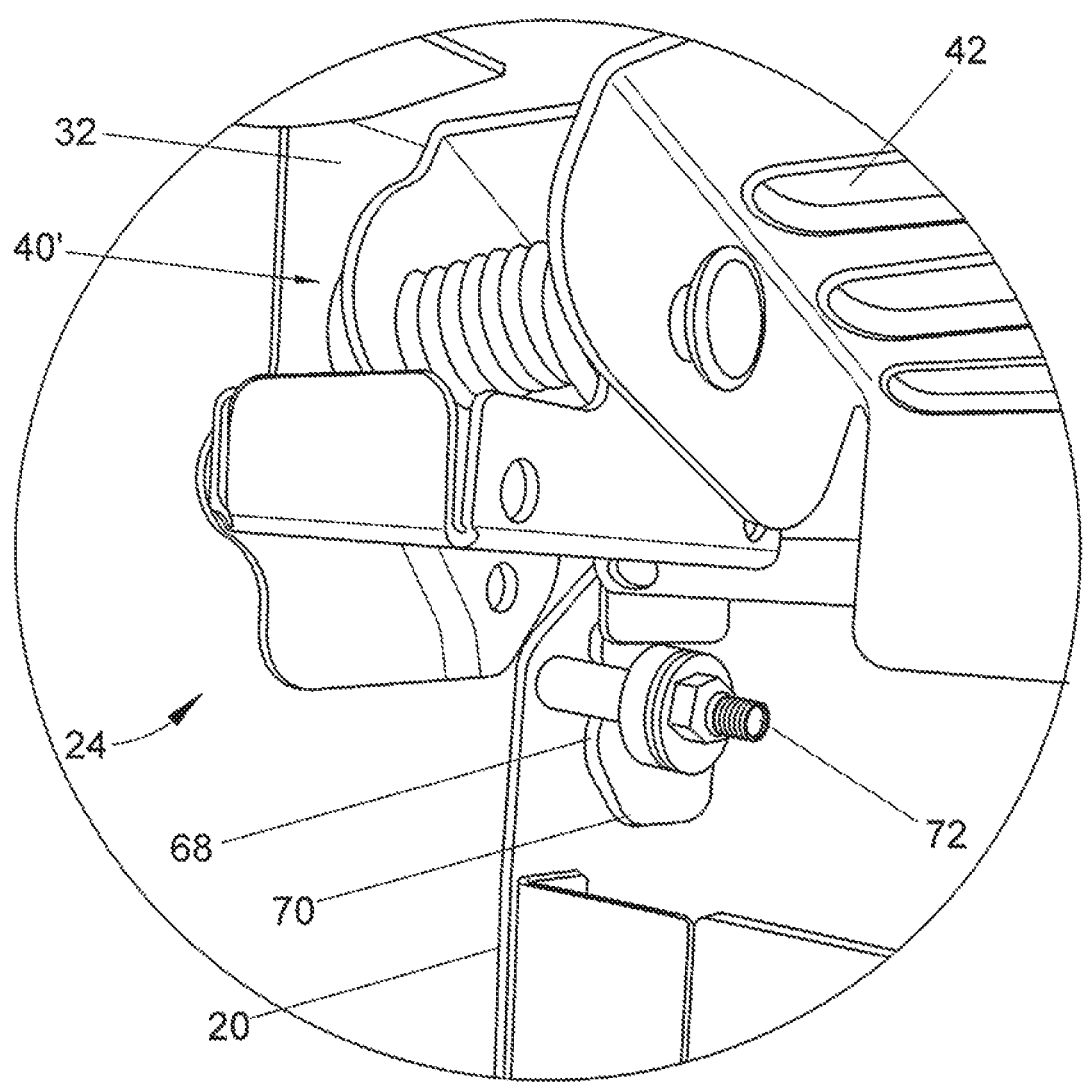
FIG. 8 illustrates a back, underside view of an embodiment of a lid hinge of the present disclosure, the lid hinge in a locked position; and, FIG. 9 illustrates the lid hinge of FIG. 8, the lid hinge in an unlocked position.

FIG. 8 shows a back, underside view of an embodiment of the lid hinge, 40', area of FIG. 2 when the cooktop, 24, is locked to the oven, 20. Specifically this shows an embodiment of the lid hinge, 40', connected to the lid, 32. The cooktop, 24, contains a friction-lock, 68, which acts as a fastener, 70, to removably-attach the cooktop, 24, to the oven, 20. The friction-lock, 68, cooperates with a bolt, 72, to securely lock the cooktop, 24, in place via friction between the friction-lock and the bolt. Other types of fasteners useful herein include snap-fit fasteners, key-locks, spring-locks, latches, etc.

Figure 9:
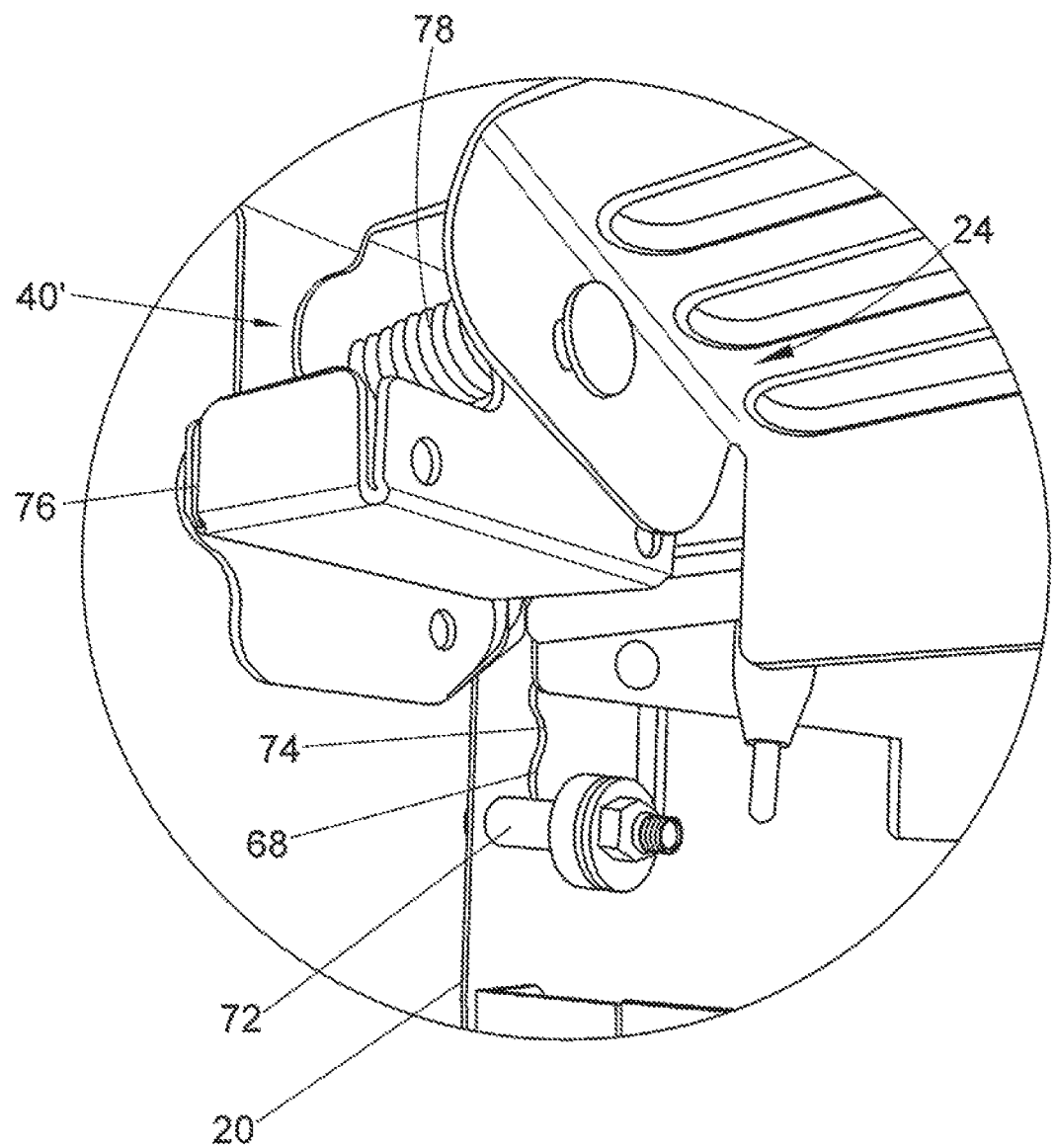

FIG. 9 shows a back, underside view of an embodiment of the lid hinge, 40', area of FIG. 2 when the cooktop, 24, is unlocked from the oven, 20. In this figure it can be seen that the friction-lock, 68, contains an indentation, 74. When the cooktop, 24, is locked to the oven, 20, then the bolt, 72, fits into the indentation and secures the cooktop, 24, to the oven, 20. However, because of the rounded edges of the indentation, 74, the user may dislodge the cooktop, 24, from the oven, 20, by pulling the cooktop, 24, upwards e.g., via the hinge bracket, 76, which supports the hinge, 40'. This may allow a partial removal and/or full removal of the cooktop, 24, from the oven. In an embodiment herein, this results in a partial removal of the cooktop, as the gas burners (see FIG. 1 at 26), and any associated gas piping/electronics may remain attached to the oven, while the rest of the cooktop, 24, is removed. In the embodiment shown, the lid hinge, 40; or each lid hinge, 40, further contains a spring, 78, which provides a bias to the lid, 32.

Typically, the cooking gate, 30, is removably-attached to; or removably-placed on, the cooktop, so as to allow easy replacement, cleaning etc.

EXAMPLES

Non-limiting specific embodiments of the present disclosure include the following.

Example 1

A gas range comprising a gas range height, the gas range comprising:
A) an oven including an oven cavity; and
B) a cooktop located above the oven, the cooktop including:
 i) a gas burner containing a gas burner height; and
 ii) a cooking grate above the gas burner, wherein the cooking grate contains a cooking grate height,
wherein a gas oxidation height is the difference between the cooking grate height and the gas burner height, wherein the gas oxidation height is from about 10 mm to about 40 mm; or from about 13 mm to about 35 mm, or from about 15 mm to about 30 mm; or from about 20 mm to about 29 mm, and wherein the gas range height is from about 350 mm to about 450 mm; or from about 375 mm to about 425 mm; or from about 390 mm to about 410 mm.

Example 2

The gas range according to Example 1, further containing a lid for covering the cooking grate, the lid including an open position and a closed position, wherein when the lid is in the closed position the gas range comprises a closed lid height, and wherein the closed lid height is from about 0 to about 10 mm higher than the gas range height; or from about 0 to about 5 mm higher than the gas range height; or from about 0 to about 3 mm higher than the gas range height.

Example 3

The gas range according to any one of the previous embodiments, wherein the oven cavity includes an oven cavity height and wherein the oven cavity height is from about 150 mm to about 310 mm; or from about 170 mm to about 280 mm; or from about 200 mm to about 260 mm.

Example 4

The gas range according to any one of the previous embodiments, wherein the oven includes an oven height, wherein the percentage of the oven height with respect to the gas range height is from about 25% to about 99%; or from about 45% to about 98%; or from about 60% to about 95%; or from about 65% to about 90%.

Example 5

A gas range containing:
A) an oven containing:
 i) an oven cavity; and
 ii) a plurality of oven exhausts;

B) a cooktop located above the oven, the cooktop containing:
  i) a gas burner; and
  ii) a cooking grate above the gas burner; and
C) a lid covering the cooking grate, the lid containing an open position and a closed position,
wherein an oven exhaust; or a plurality of oven exhausts, leads from the oven cavity to the cooktop, and wherein when the lid is closed the lid forms a flat top.

Example 6

The gas range according to Example 5, wherein the cooktop further contains a vent; or a plurality of vents, and wherein the oven exhaust leads from the oven cavity to the vent; or each oven exhaust leads from the oven cavity to the vent; or a plurality of vents.

Example 7

The gas range according to any one of the previous embodiments, wherein the oven cavity includes an oven cavity width and wherein the oven cavity width is from about 500 mm to about 250 mm; or from about 450 mm to about 300 mm; or from about 400 mm to about 350 mm.

Example 8

The gas range according to any one of the previous embodiments, containing a gas used for cooking with the gas range, wherein the gas is selected from the group of propane gas, butane gas, natural gas, and a combination thereof; or propane gas.

Example 9

The gas range according to any one of the previous embodiments, wherein the oven contains a gas oven.

Example 10

The gas range according to any one of the previous embodiments, wherein the gas range passes ANSI Z21.57-2010; or passes ANSI Z21.57-2010 and the addenda ANSI Z21.57a-2012.

Example 11

The gas range according to any one of the previous embodiments, wherein the cooktop is removably-attached to the oven.

Example 12

The gas range according to any one of Examples 2 to 11, wherein the lid contains a lid hinge and a spring, and wherein the spring and the lid hinge provide a bias selected from the group of an opening bias, a closing bias, and a combination thereof.

Example 13

The gas range according to any one of the previous embodiments, wherein the gas range is intended for installing in a vehicle.

Example 14

A counter comprising the gas range according to any one of the previous embodiments; or containing the gas range according to any one of the previous embodiments installed into the counter.

Example 15

The counter according to Example 14, wherein the counter includes a level surface, and wherein the gas range protrudes from the level surface a maximum distance of from about 0 mm to about 20 mm; or from about 0 mm to about 10 mm; or from about 0 mm to about 5 mm.

Example 16

A vehicle comprising the gas range according to any one of Embodiments 1 to 13, or the counter according to any one of Examples 14 to 15.

Example 17

The vehicle according to Example 16, wherein the vehicle is selected from the group of an automobile, an airplane, a watercraft, and a combination thereof; or a recreational vehicle, a boat, a submarine, an airplane, and a combination thereof.

It should be understood that the above only illustrates and describes examples whereby the present disclosure may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present disclosure.

The foregoing discussion has been presented for purposes of illustration and description. The foregoing is not intended to limit the disclosure to the form or forms disclosed herein. In the foregoing Summary for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A gas range comprising:
   a gas range height from about 350 mm to about 450 mm;
   an oven comprising an oven cavity;
   a cooktop disposed above the oven, the cooktop comprising:
   i) a gas burner having a gas burner height; and
   ii) a cooking grate above the gas burner, the cooking grate having a cooking grate height,
   a lid configured for covering the cooking grate in a first closed position;
   wherein a gas oxidation height is the difference between the cooking grate height and the gas burner height, and wherein the gas oxidation height is from about 10 mm to about 40 mm;
   wherein the gas range passes standard ANSI Z21.57-2010;
   wherein the gas range comprises a closed lid height from about 0 to about 10 mm greater than the gas range height.

2. The gas range according to claim 1, wherein the oven comprises an oven height, wherein the percentage of the oven height with respect to the gas range height is from about 25% to about 99%.

3. The gas range according to claim 1, wherein the cooktop is removably-attached to the oven.

4. The gas range according to claim 1, wherein the gas range is configured for use in at least one vehicle chosen from an automobile, an airplane, a watercraft, a recreational vehicle, a boat, a submarine, an airplane, and a combination thereof.

5. A counter comprising the gas range according to claim 1, wherein the gas range is installed into the counter.

6. The counter according to claim 5, wherein the counter comprises a level surface parallel to a top surface of the gas range, and wherein the top surface protrudes from the level surface a maximum distance of from about 0 mm to about 20 mm.

7. The counter of claim 5, wherein the gas range further includes a corner piece positioned between the gas range and the counter.

8. The gas range according to claim 1, wherein the lid forms a flat top in the first closed position.

9. The gas range according to claim 1, wherein the lid uncovers the cooking grate in an open position.

10. The gas range according to claim 1, wherein the lid comprises a rear section and a front section hingedly coupled to the rear section.

11. The gas range according to claim 1, wherein the gas range height is from about 390 mm to about 410 mm.

12. The gas range according to claim 1, wherein the gas oxidation height is from about 15 mm to about 30 mm.

13. The gas range according to claim 1, wherein the closed lid height is from about 0 to about 3 mm higher than the gas range height.

14. The gas range according to claim 1, wherein the gas range height, the cooking grate height, the gas burner height, and the gas oxidation height are optimal heights and facilitate maximizing an oven height of the oven, complete combustion by the cooktop, and passing standard ANSI Z21.57-2010.

* * * * *